United States Patent [19]

Mills

[11] 4,183,651

[45] Jan. 15, 1980

[54] PHOTOGRAPHIC SYSTEM, APPARATUS AND CASSETTE FOR PROCESSING A SELF-DEVELOPING FILM UNIT

[75] Inventor: Loring K. Mills, Hampton, N.H.

[73] Assignee: Polaroid Corporation, Cambridge, Mass.

[21] Appl. No.: 957,294

[22] Filed: Nov. 2, 1978

[51] Int. Cl.[2] ........................ G03D 5/02; G03B 17/52

[52] U.S. Cl. ........................................ 354/304; 354/86; 354/276

[58] Field of Search ........................ 354/84, 85, 86, 87, 354/178, 179, 301, 303, 304, 305, 312, 275, 276; 96/201

[56] References Cited

U.S. PATENT DOCUMENTS

| | | | |
|---|---|---|---|
| 2,435,720 | 2/1948 | Land | 354/86 |
| 2,495,112 | 1/1950 | Wolff | 354/85 |
| 2,880,660 | 4/1959 | Land et al. | 354/85 |
| 2,933,993 | 4/1960 | Bachelder et al. | 354/86 |
| 3,283,684 | 11/1966 | Land | 354/85 |
| 3,396,646 | 8/1968 | Land | 354/86 |
| 3,405,617 | 10/1968 | Land et al. | 354/84 |
| 3,405,618 | 10/1968 | Land et al. | 354/84 |
| 3,505,939 | 4/1970 | Hu | 354/301 |
| 3,722,383 | 3/1973 | Van Allen | 354/87 |
| 3,788,205 | 1/1974 | Pasieka et al. | 354/304 |
| 3,802,887 | 4/1974 | Sorli | 354/304 |
| 3,804,625 | 4/1974 | Sorli | 354/304 |
| 4,019,194 | 4/1977 | Cutler | 354/312 |
| 4,126,875 | 11/1978 | Wareham | 354/86 |

OTHER PUBLICATIONS

U.S. application Ser. Nos. 841,888, 841,889, filed Oct. 13, 1977, inventor–Erikson.

U.S. application Ser. No. 910,448, filed May 30, 1978, inventor–Albert Bachelder.

*Primary Examiner*—Joseph W. Hartary

*Assistant Examiner*—Alan Mathews

*Attorney, Agent, or Firm*—John S. Vale

[57] ABSTRACT

A photographic system for coupling together discrete photosensitive and image receiving sheet elements of a self-developing film unit, after the photosensitive sheet element is exposed, bringing the coupled sheet elements into superposition, and applying a compressive pressure progressively along the length of the superposed elements to distribute a processing composition therebetween. The system is especially useful from handling large format, e.g. 8×10 size, film units and includes a processor for receiving a cassette holding the photosensitive sheet, and a sheet advancing mechanism for advancing an image receiving sheet into the forward end of the cassette, through an access slot therein, wherein the image receiving sheet element becomes coupled to the photosensitive sheet. In a preferred embodiment, a portion of one of the two coupled sheet elements is automatically advanced out of a cassette withdrawal slot, in response to the image receiving sheet element insertion, to a position where it becomes engaged with a pair of pressure applying rollers that advance the coupled sheet elements out of the cassette and therebetween for processing.

25 Claims, 7 Drawing Figures

PHOTOGRAPHIC SYSTEM, APPARATUS AND CASSETTE FOR PROCESSING A SELF-DEVELOPING FILM UNIT

BACKGROUND OF THE INVENTION

1. Field of the Invention

The present invention relates to the field of photography and, more particularly, to photographic systems, apparatus, and components for handling and processing large format self-developing film units.

2. Description of the Prior Art

The introduction of professional quality 8×10 color self-developing film units for use by professional photographers in the advertising and graphic arts industry has greatly increased the demand for more simplified and efficient film processing equipment.

In a typical commercial photography application, using presently available film and processing apparatus, a discrete photosensitive or negative sheet element, provided in a light opaque protective bag, is loaded into a holding cassette and then the protective bag is withdrawn through a film withdrawal slot at the leading end of the cassette. Then the cassette is inserted into a cassette holder on the back of a commercially available 8×10 view camera, a dark slide covering the cassette exposure aperture is pulled out, and the photosensitive sheet is exposed. The dark slide is then returned to its blocking position and the cassette is removed from the camera for transfer to a processing apparatus.

For an example of a commercially available large format processor, cassette, and self-developing film unit, reference may be had to U.S. Pat. No. 4,019,194 issued on Apr. 19, 1977 to Norman W. Cutler, Jr. et al. and being assigned to the same assignee as the present invention.

As indicated in the above patent, the photosensitive sheet element includes a leader attached to its forward end having sheet coupling structure thereon including a shoulder portion and a forwardly extending relatively narrow coupling tab. The companion image-receiving sheet includes a leader mounting a rupturable container of fluid processing composition and having a leader portion with a tab receiving slot therein and shoulder bearing portions adjacent the slot.

When the photosensitive sheet element is loaded into the cassette and the protective bag is removed, the leader tab thereof extends out through the withdrawal slot and is folded over and releasably coupled to the back of the cassette before the exposure phase. Following exposure, the image-receiving sheet is inserted into the cassette in superposed relation to the photosensitive sheet element. At this point, the user detaches the tab from the back of the cassette and inserts it through the tab receiving slot of the image-receiving sheet to operatively couple the positive and negative sheets together in cassete face-to-face registration. The cassette is then transferred to the processing apparatus which has an entry slot for receiving the forward end of the cassette. When the cassette is so inserted, the protruding tab is fed into the bite of a pair of processing rollers which are driven by an electrical motor. The rollers advance the coupled positive and negative sheet elements therebetween while applying a compressive pressure progressively along the length of the film unit to discharge the fluid processing composition from its container and distribute the fluid between the superposed sheet elements. Following a short imbibition period, the positive and negative sheet elements are stripped apart to reveal the positive reflection print on the image-receiving sheet.

While this system produces excellent results, it is rather inefficient and time consuming because of the number of manual film manipulation steps involved. For each photograph, the photographer must load the negative sheet element into the cassette, withdraw the protective bag, fold the coupling tab over the back of the cassette and attach it to a receiving post, load the image-receiving sheet into the cassette following exposure, detach the coupling tab from the cassette, and finally thread the tab through the receiving slot of the image-receiving sheet to couple the positive and negative sheet elements together.

An improved and more efficient version of the above described system is disclosed in commonly assigned copending applications U.S. Ser. Nos. 841,888 and 841,889 both being filed on Oct. 13, 1977 by Herman E. Erikson. In this system, the image-receiving sheet element is placed in a tray on the processor. When the cassette holding the negative sheet element is inserted into a tray, the protruding coupling tab is automatically inserted through the slot on the image-receiving element and into the bite of the processing rollers. Thus while the step of manually coupling the two leaders together is eliminated, the photographer must still manually manipulate the coupling tab protruding out of the cassette. Also, the system is capable of only handling one film unit at a time. That is, for each photograph the cassette must be loaded with a single negative sheet element and its corresponding positive sheet must be manually placed in the processor receiving tray.

What is needed is a simplified system where the positive and negative sheet elements may be bulk loaded in appropriate cassette, and/or the processor to eliminate much of the time consuming manual sheet element loading and coupling operations. Also, it is highly desirable to provide a system wherein the coupling tabs or other leader structure do not protrude from the cassette to eliminate the possibility of damage to these tabs and other structure or their interference with the photographic operation.

Self-developing photographic systems wherein discrete negative and positive sheet elements are prepackaged in separate cassettes or are bulk loaded into separate storage chambers of an apparatus and are subsequently brought into superposition for processing are, of course, well known in the photographic art.

For example, U.S. Pat. No. 3,396,646 discloses a camera wherein a pair of feed rollers advance separate positive and negative sheets simultaneously from two separate storage locations into superposed relation and into operative relation with a pressure-applying device. However, the two sheets are not positively coupled together to insure accurate registration. It is obvious that misregistration may occur if there is any slippage at the roller sheet element interfaces.

U.S. Pat. Nos. 2,435,720 and 3,283,684 are representative examples wherein separate positive and negative sheet elements are held in separate cassettes and are subsequently pulled through a pressure-applying device while being brought into face-to-face relation. However, sheet advancement is accomplished by simultaneously pulling on leaders attached to the two sheet elements. By necessity, this design requires that the leaders protrude from the cassettes which is a distinct disadvantage and may result in damage to the leaders or accidental removal of the sheet elements from their respective holding cassettes.

U.S. Pat. Nos. 3,405,617 and 3,405,618 are directed to self-developing photographic apparatus, such as a camera, which holds positive and negative sheet elements provided in separate cassettes. In this design, the cassettes and sheet elements are configured so that leaders or connecting tabs do not protrude from the cassettes prior to the operation of bringing the sheets into superposition for processing. In U.S. Pat. No. 3,405,618, the photosensitive sheet element is exposed and then advanced out of its cassette into a tank holding a liquid processing composition. When the negative sheet element is fully inserted in the tank, its top leader end projects out of the tank in the vicinity of the bite line of a pair of processing rollers. The image-receiving sheet is then advanced from its cassette to a position where its leader end deflects the leader end of the photosensitive sheet element into the bite of the processing rollers which advance the sheets relative thereto to bring them into superposition while applying pressure. In this design, the two sheet elements are not positively coupled together leading to the possibility of misregistration.

The camera disclosed in U.S. Pat. No. 3,405,617 is of similar design, however the leading end of the photosensitive sheet element protruding from the processing tank has a tab receiving slot therein and the leader end of the image-receiving element includes a tapered coupling tab on its leader. When the photosensitive sheet element is fully inserted in the tank, the tab slot in the protruding leader is aligned with the bite line of the pressure applying rollers. The image-receiving sheet is advanced along the path of travel whereby its coupling tab advances through the leader slot and into the bite line of the pressure-applying rollers. Thus the photosensitive and image-receiving sheet elements are positively coupled together to insure accurate registration before the sheets are brought into superposition for processing. However, it should be noted, to effect coupling, the photosensitive sheet element must be completely removed from its holding cassette which requires a substantial number of film handling components to manipulate the two sheet elements in a manner described. Thus, the design suffers somewhat in that it becomes complex mechanically and rather expensive to produce.

Therefore, it is an object of the present invention to provide an easy to use and simple system for operatively coupling together first and second sheet elements of a self-developing film unit; and bringing the sheet elements into superposition for processing the same.

It is yet another object of the invention to provide a photographic apparatus wherein at least one of the sheet elements is held in a cassette supported on the apparatus and having an access opening therein and the apparatus includes sheet advancing means for advancing the second sheet element of a film unit through the access opening whereupon it automatically becomes coupled with the first sheet element therein.

It is yet another object to provide such a photographic apparatus wherein a portion of the leader of one of the two sheet elements is automatically advanced through a withdrawal opening in the cassette and located at a position where it may be engaged, for example by a pair of pressure-applying rollers, for automatically advancing the first and second coupled sheet elements from the cassette to bring them into superposition for processing.

It is yet another object of the invention to provide such an apparatus and cassette wherein the cassette is configured to hold a stack of sheet elements therein so the coupling means or the leaders on the sheet elements held in the cassette do not protrude therefrom during normal handling and manipulative operations so that these leaders are protected from damage prior to sheet advancement from the cassette for processing operations.

SUMMARY OF THE INVENTION

The present invention provides a photographic apparatus for coupling together discrete first and second sheet elements of a self-developing film unit in preparation for bringing the sheet elements into superposed relation and distributing a fluid processing composition therebetween.

The first sheet element, preferably including an image-receiving sheet, and a second sheet element, preferably including a photosensitive sheet, have thereon, respectively, first and second coupling means for operatively coupling the sheet elements to one another. The second sheet element is initially held in a cassette having an access opening, communicating with the second coupling means thereon, and a withdrawal opening through which the coupled first and second elements may be withdrawn from the cassette.

The film handling and processing apparatus includes a support frame, means, such as a receiving chamber, for supporting a cassette holding at least one photosensitive sheet element therein and means, such as a receiving chamber, for holding at least one image-receiving sheet element at a storage position located outside of the cassette holding the photosensitive sheet element.

The apparatus further includes sheet advancing means and guide means which are operative such that the image-receiving sheet is advanced from the storage position along a path of travel into the access opening of the cassette whereby the coupling means on the image-receiving sheet, preferably a leader including a shoulder portion and a forwardly extending coupling tab, advance into the cassette and become operatively coupled with the second coupling means, preferably a leader including a slot therein and a shoulder bearing portion adjacent the slot. In response to advancing the image-receiving sheet along the path of travel, the coupling tab thereon advances through the access opening, through the tab receiving slot and out through the withdrawal slot in the leading end of the cassette.

Preferably, the tab advances into the bite of a pair of pressure applying rollers which then advance the coupled sheet elements together out of the cassette and therebetween for fluid distribution.

Advantageously, the image-receiving sheet element is advanced into the cassette through the access opening and exits therefrom through the withdrawal slot after it picks up or becomes coupled to the photosensitive sheet element.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
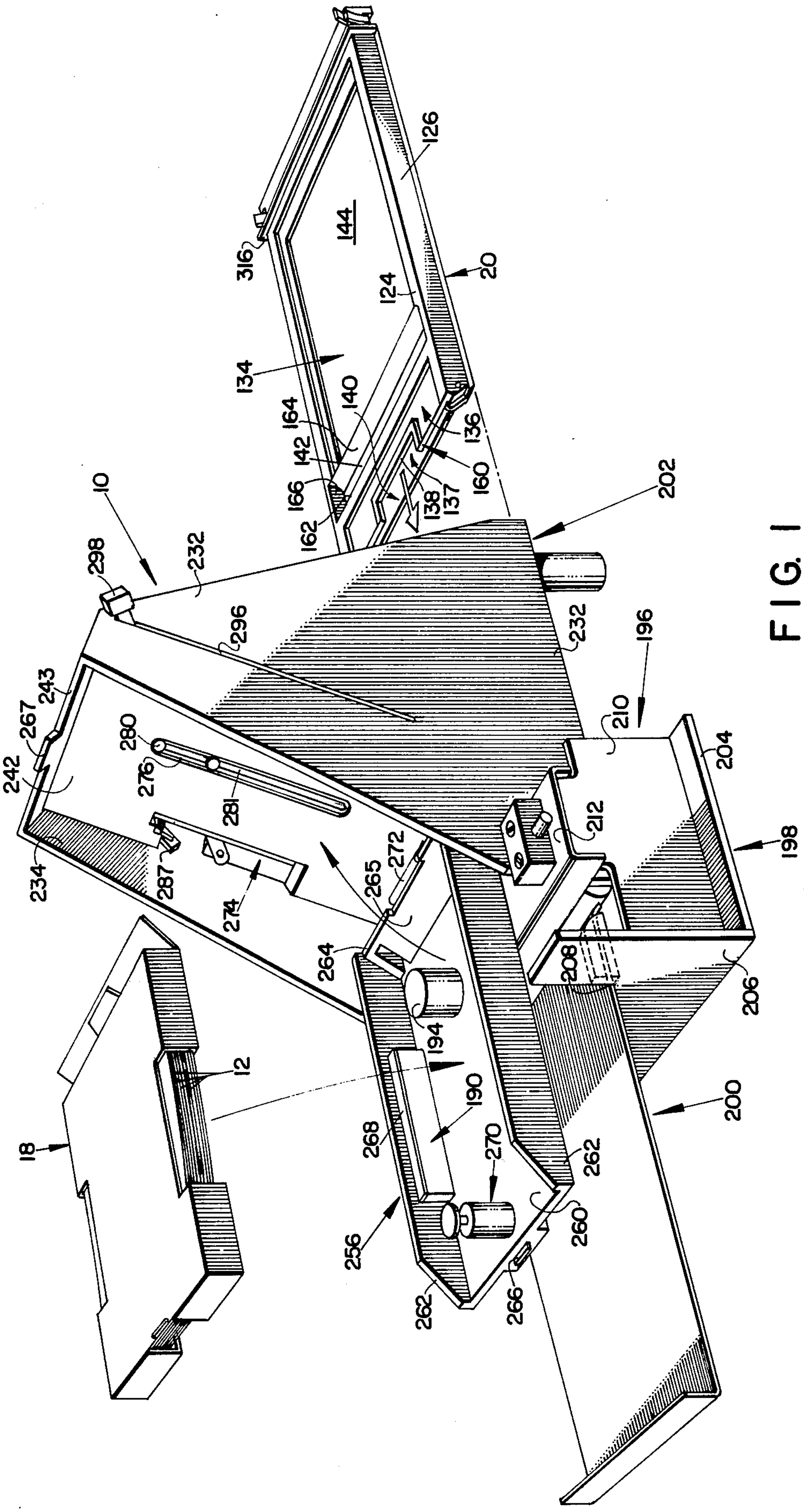
FIG. 1 is a perspective view of a photographic apparatus, embodying the present invention, for handling and processing discrete sheet elements of a self-developing film unit annd two cassettes for holding these sheet elements.
Figure 3:
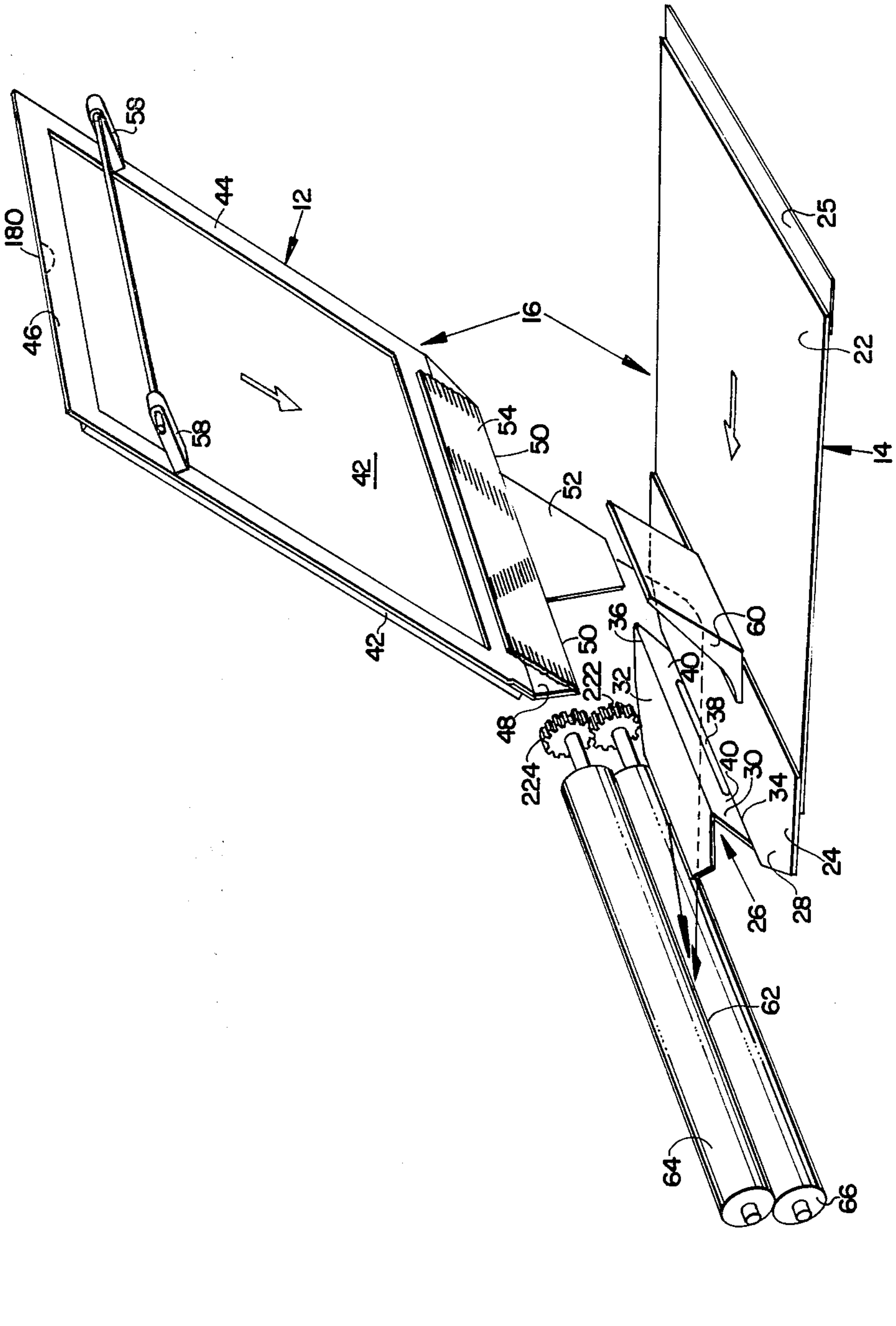
FIG. 3 is a perspective view of selected components of the apparatus and the two sheet elements of the film unit showing the relative positions prior to coupling and processing.

With reference to FIGS. 1 and 3, the present inventions provides a photographic apparatus 10 for holding discrete first and second sheet elements 12 and 14, respectively, of a self-developing film unit 16; operatively coupling elements 12 and 14 to one another; bringing the coupled sheet elements 12 and 14 into superposed relation; and applying a compressive pressure progressively along the length of the superposed sheet elements to distribute a fluid processing composition therebetween. In a preferred embodiment, apparatus 10 is configured to receive and support a first cassette 18 holding a stack of sheet elements 12 and a second cassette 20 holding a stack of sheet elements 14 therein.

Together, apparatus 10, film unit sheet elements 12 and 14, and cassettes 18 and 20 cooperate to form a photographic system for handling and processing large format self-developing film units 16.

In the illustrated embodiment, the second sheet element 14 is a photosensitive element, and element 12 is an image-receiving element. The illustrated film unit 16 is of a large format type which may include 8×10 color or black and white reflective print or film units or X-ray film units.

The illustrated cassette 20 is configured to hold a stack of photosensitive sheet elements 14 used in a reflective print film unit 16. For exosure, the cassette 20 is mounted on the back of a conventional 8×10 view camera and a foremost sheet element 14 is exposed. Then cassette 20 is transferred to apparatus 10 where the exposed sheet element 14 is coupled together with an image-receiving sheet element 12. The coupled sheet elements are then brought into superposition and are advanced between a pair of later-to-be described pressure-applying rollers for fluid distribution.

As best shown in FIG. 3, the photosensitive sheet element 14 includes a rectangular base sheet 22 having one or more photosensitive layers thereon, a second leader 24 attached to the leading end of sheet 22, and a hold back tab 25 secured to the trailing end of sheet 22.

Leader 24 includes a Z-folded portion 26 defined by a bottom section 28, a middle section 30, a top section 32, a bottom fold line 34 between sections 28 and 30, and a top fold line 36 between sections 30 and 32. Leader 24 is preferably formed at a medium stiffness paper, light cardboard, or plastic material so that the Z-folded portion 26 is somewhat resilient and inherently tends to assume a natural expanded position where a top section 32 is spaced from bottom section 28 by the obliquely inclined middle section 30.

Leader 24 includes thereon second coupling means which will cooperate with the later-to-be-described first coupling means on sheet element 12 to operatively couple sheets 12 and 14 together in preparation to bring them into superposition. The second coupling means includes a laterally extending centered tab receiving slot 38 in middle section 30 adjacent bottom fold line 34 and laterally spaced shoulder bearing portions 40 adjacent opposite ends of slot 38 and including portions of the fold line 34.

The first or image-receiving sheet element 12 includes a rectangular base sheet 42 having one or more image-receiving layers thereon, a rectangular mask 44 defining marginal borders surrounding the central image-receiving portion of sheet 42 and including a trailing end hold back tab section 46 that extends beyond the trailing end of sheet 42 and a leading end portion to which is coupled a first leading 48. Leader 48 is preferably formed of a medium stiffness paper, cardboard, or plastic material and includes first coupling means comprising a laterally disposed shoulder or lateral forward edge portion 50 and a tapered coupling tab 52 which is narrower than and extends forwardly of shoulder portion 50. Also mounted on first leader 48 behind shoulder portion 50 is a rupturable container 54 holding a supply of fluid processing composition 56 shown in the cross-sectional view of FIG. 2.

FIG. 3 shows the two sheet elements 12 and 14 as they are held in their relative positions in apparatus 10 prior to coupling and processing. A later-to-be-described sheet advancing device includes a pair of pick members 58 which frictionally engage the lateral margin portions of mask 44 and are driven downwardly, as viewed in FIG. 3, to advance sheet 12 out of its cassette 18 and along a downward and forwardly extending path of travel defined in part by a later-to-be-described guide ramp 60 whereby the leader portion 48 enters into cassette 20 and the tab 52 on element 14 advances through the tab receiving slot 38 on the second leader 24 of the forwardmost sheet element 14 in cassette 20. It will be noted that the tab 52 and slot 38 are dimensioned such that tab 52 may advance through slot 38 but the wider shoulder portions 50 engage the shoulder bearing portions 40 in abutting relation thereby coupling the first and second sheet elements together for simultaneous movement in response to further forward advancement of the coupling tab 52. As will be described later, sheet element 12 is advanced sufficiently along its path of travel such that the tab 52 which extends through slot 38 and also extends outwardly from a withdrawal slot in cassette 20 is advanced to a tab engagement position where the leading end of tab 52 enters into the bite 62 of a pair of juxtaposed pressure-applying rollers 64 and 66 of apparatus 10. As will be described later, rollers 64 and 66 are driven in the appropriate directions whereby they advance the coupled sheet element 12 and 14 forwardly therebetween and relative thereto and thereby bring elements 12 and 14 into superposition and apply the compressive pressure progressively along the length of the superposed elements to rupture container 54 and distribute the fluid processing composition 56 between the facing photosensitive and image-receiving layers of base sheet 22 and 42 respectively.

As noted earlier, the film unit 16 may be configured for use with X-ray apparatus or to provide conventional black and white or color reflection prints. For a more detailed description of the chemical composition of suitable photosensitive and image-receiving layers and compatible fluid processing compositions, reference may be had to U.S. Pat. No. 2,983,606 issued to Howard G. Rogers on May 9, 1961, and U.S. Pat. Nos. 2,698,236; 2,698,237; and 2,698,245 issued to Edwin H. Land on Dec. 28, 1954.

The second cassette 20 for holding a plurality of photosensitive sheet elements 14 therein will be described now with reference to FIGS. 1, 2, and 6.

In the illustrated preferred embodiment of cassette 20 it is configured to receive a stack of approximately 10 photosensitive sheet elements 14 that are initially provided in a light proof disposable protective bag 68. Protective bag 68 is generally rectangular in shape and is formed of any suitable light opaque material such as black paper or plastic. The forward end of bag 68 is closed and includes a centrally disposed, forwardly extending tab 70 thereon. At the trailing end, an opening 71 is provided through which the stack of sheet elements 14 is inserted, leader 24 end first, so that the trailing edges of hold back tabs 25 extend outwardly a short distance beyond the edges of opening 71 when sheet elements 14 are fully inserted. After loading, bag 68 is rendered light tight by a releasably secured light sealing bag closure 72. Closure 72 is preferably formed of a medium stiffness paper, cardboard or plastic material folded in a double Z fold structure. It includes forwardly folded over panels 74, folded back panels 76 and folded forward panels 78. The interior surfaces of panel 74 fit over the portions of the stack of hold back tabs 25 projecting out of opening 71 and the forwardmost half of panels 74 are inserted into bag 68 through opening 71. The outside panels 78 then fit over the exterior surface of the top and bottom wall sections of bag 68 to thereby form a labyrinth light seal. As will be explained later, when bag 68 is inserted into cassette 20, a hold back pin will pierce the back portion of panel 74 and the stack of hold back tabs 25 therein thereby releasably securing the closure member 72 and the stack of sheet elements 14 to cassette 20. The forward tab 70 of bag 68 becomes inserted into the bite 62 of rollers 64 and 66 when cassette 20 is operatively positioned in apparatus 10 and the rollers advance bag 68 out of cassette 20 to uncover the stack of sheet elements 14 therein.

Figure 2:
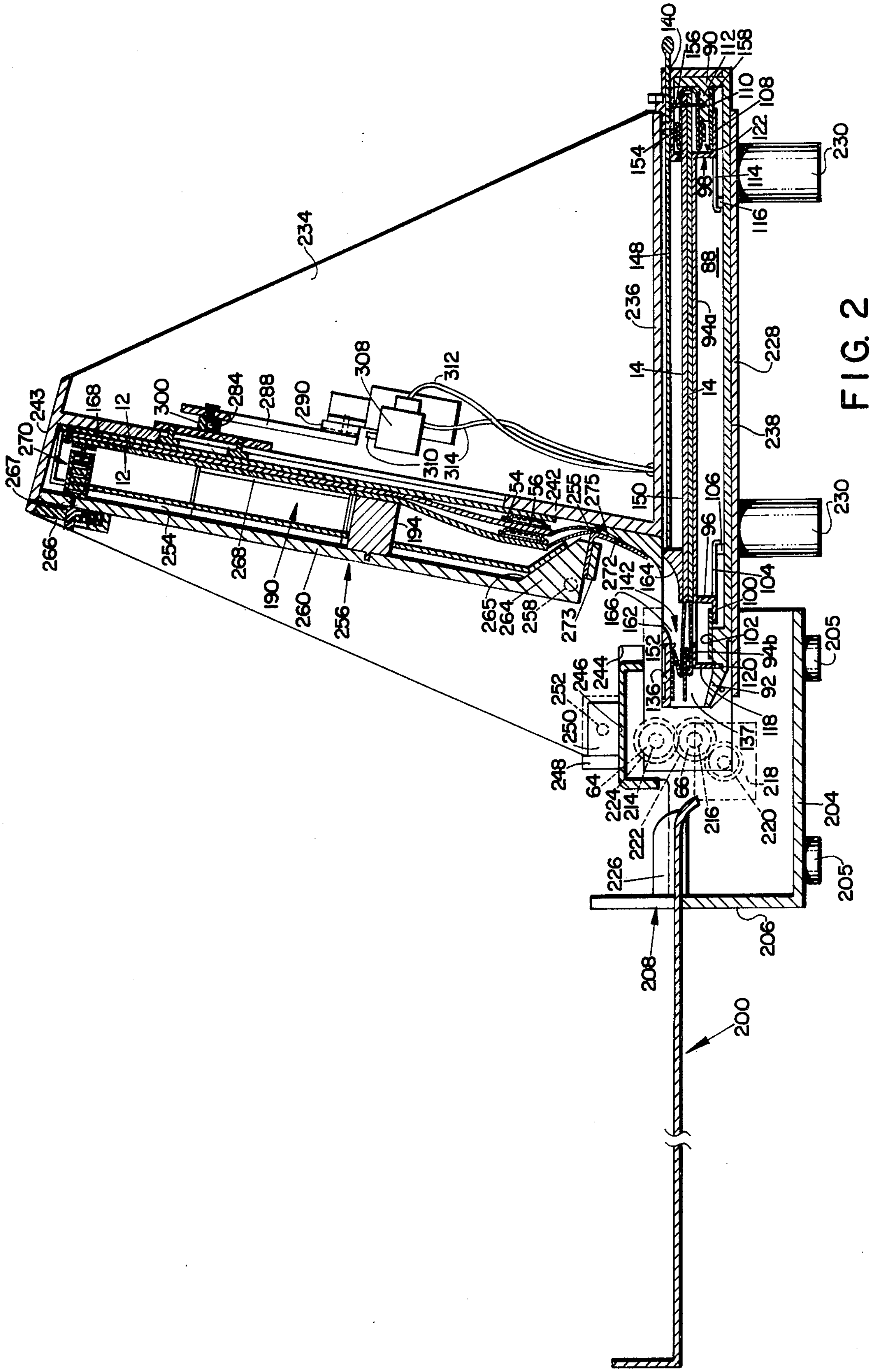
FIG. 2 is a cross-sectional view of the apparatus of FIG. 1 shown with the two cassettes located at their operative positions therein.
Figure 6:
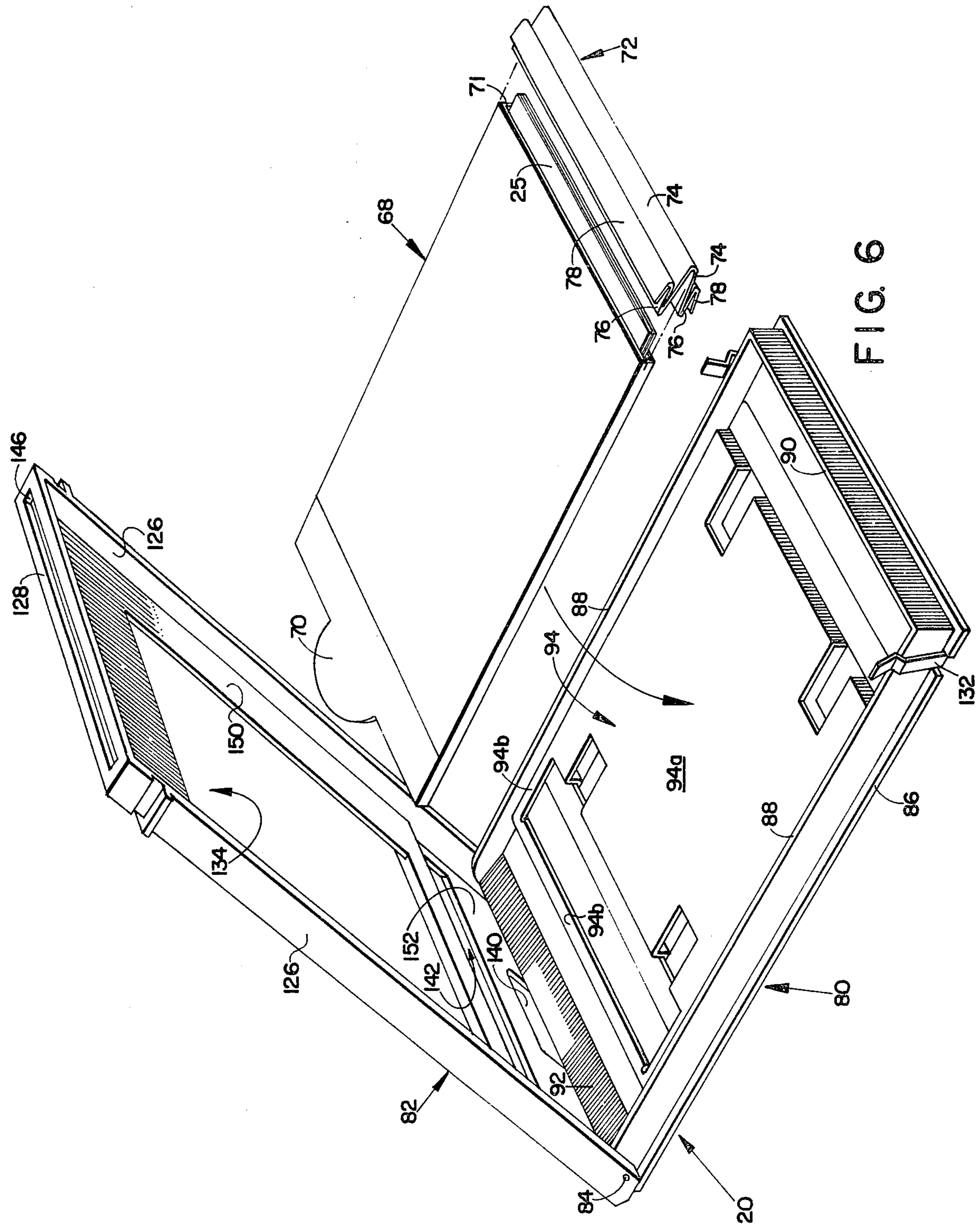
FIG. 6 is a perspective view showing a photosensitive sheet element cassette, shown in its open position, and a light-tight bag for holding a stack of such photosensitive sheet elements shown with its trailing end closure detached.

The second cassette 20 is of the book opening type including a cassette housing defined by a base section 80 and a cover section 82 pivotally coupled to base section 80 at their forward ends by pivot pins 84 for movement between the closed operative position of FIGS. 1 and 2 and the open film loading position of FIG. 6.

Sections 80 and 82 of cassette 20 are preferably of molded plastic construction and the cassette is dimensioned to fit the cassette mounting bracket on the back of conventional 8×10 view cameras.

Base section 80 includes a generally rectangular planar bottom wall 86 and an upstanding peripheral section defined by longitudinal side walls 88, lateral trailing end wall 90, and a laterally disposed upwardly inclined leading end wall section 92 at the forward end of the cassette which defines, in part, a later-to-be-described film withdrawal opening 137 at the leading end of cassette 20.

Positioned over the interior surface of bottom wall 80 is a spring platen 94 for urging the stack of sheet elements 14 upwardly toward the upper cassette section 82. It will be noted that a top film engaging surface of platen 94 includes a generally rectangular area 94a for supporting the base sheet portion of a sheet element 14 and a second smaller area designated 94b positioned forwardly of area 94a for supporting the leader portion 24 of elements 14.

In the illustrated embodiment, platen 94 is a sheet metal part having integral spring legs formed from various punched out sections. As best shown in FIG. 2, the depending leg structure includes a pair of forward legs 96 and a pair of rear legs 98. Each leg 96 includes a forwardly extending stop flange 100 which fits under a horizontal shelf plate 102 on leading end wall section 92 for limiting the upward movement of the forward end of platen 94. Extending rearwardly from leg 96 is a spring leg 104 that provides the upward biasing force for the forward end of platen 94. Spring leg 104 rests on and hooks over an upstanding laterally extending rib 106 on bottom wall 86.

The rear leg 98 is structured in a similar manner and its stop flange 108 is positioned under a rear horizontal plate 110 secured to the underside of a laterally extending short horizontal wall section 112 integrally formed with rear wall 90. The forwardly extending spring leg 114 for providing an upward biasing force on the trailing end of platen 94 is supported and hooks onto an upstanding locating rib 116 on bottom wall 86. The front end of the platen 94 includes a turned down stiffening lip 118 at the leading end of portion 94b. Clearance for lip 118 during up and down movement of platen 94 is provided by a laterally extending slot 120 in leading end wall section 92.

It will be noted that the trailing end of platen section 94a stops short of trailing end wall 90 to define a portion of a trailing end chamber 122 for receiving the relatively thick closure portion 72 of the protective film bag 68.

The cover portion 82 of cassette 20 includes a generally planar forward wall 124 and a peripheral section defined by depending longitudinal side walls 126 and the transversely disposed depending trailing end wall 128. It will be noted that side walls 126 have latch receiving slots 130 therein for operatively receiving detent latch springs 132 on base section 80 to releasably latch sections 80 and 82 together in the closed configuration.

The cover section 82 includes a number of integrally molded openings therein. The major opening 134 is rectangular in shape and serves as a radiation transmission section through which actinic light is transmitted to expose the forwardmost photosensitive sheet element 14 in the stack. While the illustrated embodiment shows a light transmitting opening 134, it will be obvious to those skilled in the art that cassette 20 may be configured for X-ray applications wherein the radiation transmission section may be defined by an X-ray transmitting but light opaque cover sheet over the photosensitive area of sheet element 14. To protect the forwardmost photosensitive element 14 from fogging by ambient illumination, the rectangular opening 134, i.e. exposure aperture 134, is normally covered by a later-to-be-described dark slide, except, of course, for actual exposures.

The leading end section 136 of forward wall 124 cooperates with the underlying lead end section 92 of base section 80 to define, in part, a laterally extending film withdrawal slot 137 at the leading end of cassette 20. It will be noted that section 136 includes a rearwardly extending center recess section 138 which defines a U-shaped recess 140 at the leading edge of cover section 82. As best shown in FIG. 6, the recess 140 is required to provide an opening at the forward end of cassette 20, when cover section 82 is raised, through which the forwardly extending tab 70 of film protective bag 68 may protrude and extend forwardly of the leading end of cassette 20 when bag 68 is initially positioned in base section 80.

Located in forward wall 124, intermediate the light transmission section 134 and the withdrawal slot 137, is an elongated laterally extending access opening 142 that provides access and communication with the second coupling means on leader 24 of the forwardmost sheet element 14 and through which the leader portion 48 of the image-receiving sheet element 12 is initially advanced to bring the first coupling means thereon into operative relationship with the second coupling means on leader 24 in cassette 20. Access opening 142 will be described in more detail later. As best shown in FIGS. 2 and 6, a flat plate-like dark slide 144 is provided for selectively blocking exposure aperture 134 and is insertable into its blocking position through a transverse slot 146 in rear wall 128 as best shown in FIGS. 2 and 6. Slot 146 communicates with longitudinal guide channels 148, in side walls 126 and forward wall 124, along which dark slide 144 is advanced to assume its blocking position.

As best shown in FIG. 2 the underside surface 150 of forward wall 124 about the periphery of exposure aperture 134, serves as a reference bearing surface or support surface against which the spring platen 94 urges the photosensitive surface of the forwardmost base sheet 22 to locate it in a given plane. The upper exterior surface of forward wall 124 serves as an external bearing surface which locates up against a camera back reference surface so that the forwardmost sheet element 14 in the cassette is located at the camera's focal plane when cassette 20 is mounted thereon.

Cassette 20 also includes a second reference bearing surface 152 on the underside of leading end section 136 which serves as a support and locating surface for the leader portion 24 of the forwardmost sheet element 14. As best shown in FIG. 2 it can be seen that surface 152 is offset upwardly with respect to support surface 150. That is, support surface 152 is higher than the given plane for the photosensitive base sheet 22 defined by surface 150. This offset structure allowed the Z-folded portion 26 to assume its expanded configuration where the middle section 30 is obliquely inclined with respect to the horizontal bottom and top sections 28 and 32. Surface 152 cooperates with the platen section 94*b* to maintain the Z-folded portion 26 of the forwardmost sheet element 14 in its operative expanded configuration so that the tab 52 of sheet element 12 may advance easily between the bottom section 28 and the middle section 30 and through the tab receiving slot 38. In other words, when the Z-folded portion 26 is in its expanded condition, the bottom section 28 and the middle section 30 serve as a V-shaped guide channel for positively guiding the advancing tab 52 through slot 38. It will be noted that the Z-folded portion 26 of the next underlying leader 24 is maintained in its compact folded position by the action of spring platen section 94*b* on its underside and the downward force thereon provided by surface 152 in combination with the resilient properties of the expanded Z folded section 26 of the forwardmost leader 24.

At the trailing end of cover section 82, the forward wall 124 has a cut out section 154 on its underside which cooperates with previously described opposing structure of base section 80 to define the hollow receiving chamber 122 for bag closure 72 and the stack of hold back tabs 25 of sheet elements 14 therein. To releasably secure closure 72 and the stack of hold back tabs 25 to cassette 20, in preparation for withdrawing the forward portion of bag 68, the cover section 82 is provided with a sharp depending hold back pin 156 that pierces closure 72 and tabs 25 when cover section 82 is closed. In the fully closed position, the lower end of pin 156 extends into an aligned pin receiving slot 158 in the previously noted short wall section 112. Thus with the trailing ends of the stack of sheet elements 14 releasably secured to cassette 20, bag 68 may be removed from cassette 20 by advancing it forwardly through the film unit withdrawal slot 137 at the forward end of the cassette 20.

The elongated transverse access slot 142 is defined, in part, by a trailing laterally extending rear edge 162 of forward wall section 136. It will be noted that the support surface 152 curves upwardly to edge 162 to provide a smooth guide surface for the incoming coupling tab 52. Access opening 142 is further defined by a laterally extending curved ramp surface 164 that is rearwardly spaced from edge 162 and by a pair of side guide walls 166 which are dimensioned with respect to sheet element 14 to provide side-to-side guidance and registration as the sheet element 12 is advanced into cassette 20 through access slot 142.

Although not shown in the drawings for the sake of visual clarity cassette 20 also includes conventional light sealing structures that are well known to those skilled in the photographic art for light sealing the various described apertures to prevent fogging of the photosensitive sheet elements 14 therein after protective bag 68 is removed.

Figure 4:
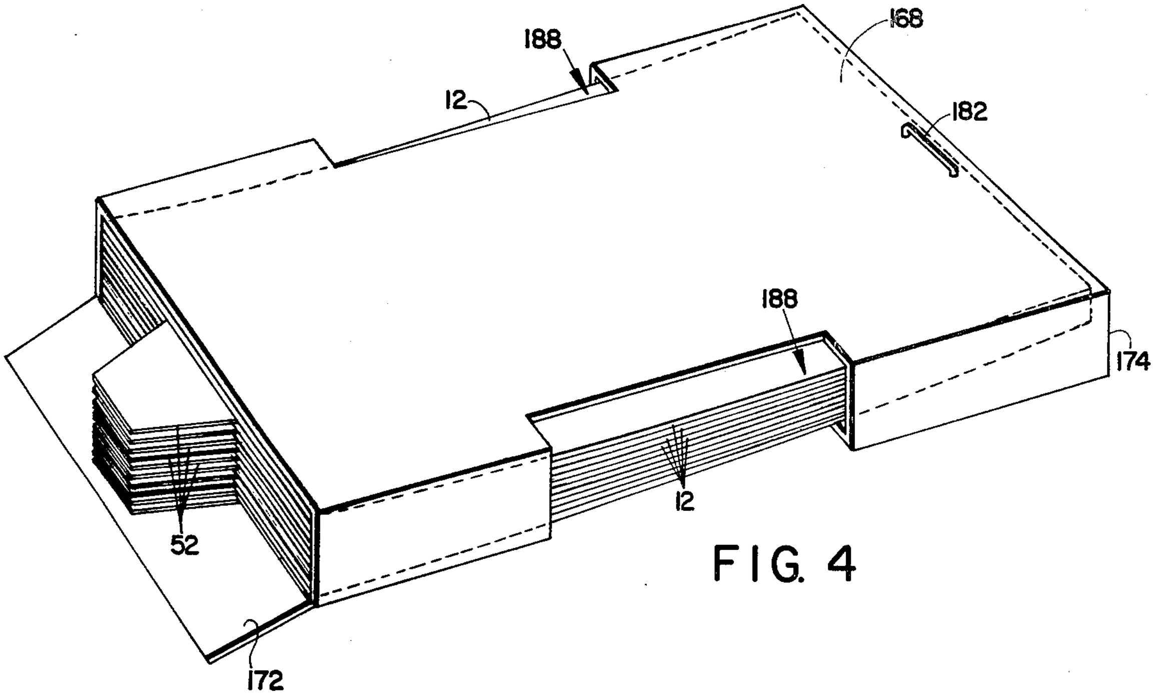
FIG. 4 is a front perspective view of a cassette holding a stack of image-receiving sheet elements therein.
Figure 5:
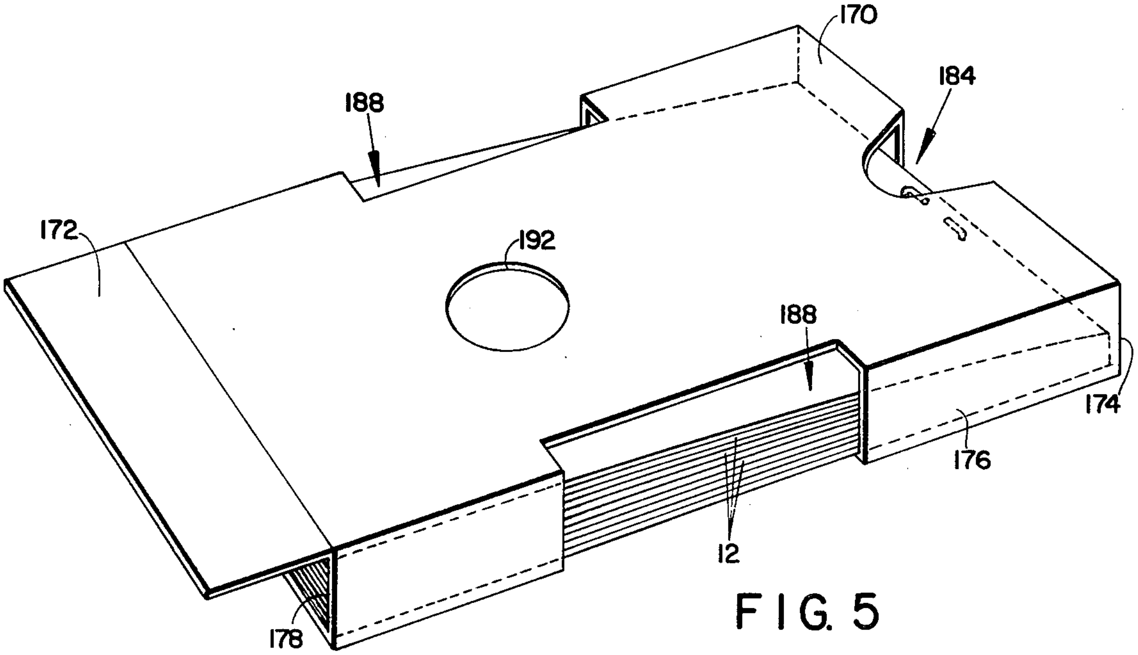
FIG. 5 is a rear perspective view of the cassette shown in FIG. 4.

As best shown in FIGS. 1, 4 and 5, the first cassette 18 for holding a stack of image-receiving sheet elements 12 is a box-like structure having a rectangular cross section and preferably being formed of any suitable light weight material such as heavy paper, cardboard, or the like. Cassette 18 is defined by forward wall 168, and opposed elongated rear wall 170 having a deflectable bottom flap 172 at the lower end of cassette 18, and a peripheral section formed by top end wall 174 and a pair of longitudinally extending side walls 176. An opening 178 is provided at the bottom end of cassette 18 through which the sheet elements 12 are inserted and subsequently withdrawn from the cassette 18.

As best shown in FIG. 3, each of the sheet elements 12 includes a weakened perforated center section 180 in its hold back tab 46 and the stack of sheet elements 12 is releasably secured to cassette 18 by stapling the stack of hold back tabs 46 to the top end of cassette wall 168 by means of the staple 182 passing through the weakened center sections 180. As best shown in FIG. 5, access for the stapling operation is provided by a central top opening 184 in rear wall 170 and top wall 174. Opening 184 also provides access for a later-to-be-described sheet biasing hold back plunger assembly 270 associated with apparatus 10. Once the sheets 12 are stapled to cassette 18 in this manner, the individual sheet elements 12 may be pulled through opening 178 without the next underlying sheet moving therewith. A sheet element 12 is so released in response to a pulling force thereon that exceeds the strength of the breakaway connection defined by perforated section 180.

Cassette 18 is also provided with a pair of longitudinally extending contiguous side openings 188 in forward wall 168, side walls 176, and bottom wall 170 to provide access to both the forward and rear lateral margin portions of the sheet elements 12. On forward wall 168 the marginal openings or slots 188 provide access for the pick devices 58 to engage the forwardmost sheet element 12 in the stack and on the rear wall 170, the opposing marginal slots 188 provide access for a pair of margin supports 190 (see FIG. 1) to be described later for supporting the stack of sheet elements 12 in operative relation to picks 58.

There is a tendency for the sheet elements 12 to bow in a concave manner prior to processing. In order to maintain the stack of sheet elements 12 in a substantially planar configuration, an access opening 192 is provided in rear wall 170 of cassette 18 and through which a later-to-be-described sheet urging center support or anti-bowing member 194 (see FIG. 1) extends into bearing relation with the rearwardmost sheet element 12 in the stack to provide support for the center portions of the sheet elements 12. As best shown in FIGS. 4 and 5, with the stack of sheet elements 12 fully inserted into and releasably secured to cassette 18, the stack of portions of leaders 48 including the shoulder 50 and the rupturable container 54 thereon are located within cassette 18 while the stack of coupling tabs 52 extend outwardly through bottom opening 178 and are positioned over deflectable flap 172. It will be noted, that the stack takes on the appearance of a tapered wedge within the cassette 18 because the individual sheet elements 12 are much thicker at the leader 48 end including containers 54 than at the trailing end defined by the hold back tabs 46.

The apparatus 10 for the handling and processing of the discrete sheet elements 12 and 14 of self-developing film unit 16 will now be described with reference to FIGS. 1, 2, 3 and 7.

Apparatus 10 includes a base or support frame 196 for mounting and supporting the various apparatus components. In the illustrated embodiment, support frame 196 includes a forward section 198 for mounting the processing rollers 64 and 66 along with a film unit receiving tray 200 on the exit side of the rollers and a later-to-be-described system for driving the rollers, and a rear base frame section 202 (releasably coupled to section 198) for receiving and supporting cassettes 18 and 20 in operative relation to one another and the pressure-applying rollers 62 and 64 and a later-to-be-described sheet advancing mechanism which includes the previously noted picks 58. While the illustrated base frame 196 is shown to have detachable forward and rear sections 198 and 202, respectively, which make the frame 196 easier to manufacture, transport, and store, it is certainly in the scope of the present invention to provide a single or unitized base frame 196.

The forward section 198 of base frame 196 includes a flat base plate 204 having depending short rubber feet or legs 205 on the underside thereof. At the leading end of base plate 204 is an upstanding vertical forward wall 206 having a centrally disposed upper U-shaped opening 208 therein through which tray 200 extends. Extending rearwardly from wall 206 is a pair of laterally spaced upstanding side walls 210 on base plate 204 and a transversely extending cross brace and roller cover member 212 secured to an upper flange portion of each of the side walls 210.

The pressure-applying rollers 64 and 66 include fixed axial shafts 214 and 216 respectively which are rotatably journaled in bearings (not shown) mounted on side walls 210.

The means for rotatively driving at least one of the rollers 64 and 66 to effect the advancement of superposed sheet elements 12 and 14 therebetween for bringing the sheet elements 12 and 14 into superposition, rupturing container 54 and distributing the fluid processing composition therein between sheet elements 12 and 14 include an electrical motor 218 mounted on one side of the side walls 210; a drive gear 220 secured to the output shaft of motor 218; a lower roller gear 222 on the end of roller 66 in operative mesh with drive gear 220; and an upper roller gear 224 on the end of roller 64 being in operative mesh with lower roller gear 222.

As best shown in FIG. 2 the tray 200 is located on the exit side of rollers 64 and 66 with its upper support surface in operative alignment with the exit path of travel of a film unit 16 advancing from the bite 62 of rollers 64 and 66. The rear portion of tray 200 is secured to laterally spaced rearwardly extending flanges 226 mounted on the interior surface of forward wall 206.

The rear section 202 of base frame 196 includes a generally rectangular, planar bottom wall 228 having four support legs 230 depending therefrom. Extending upwardly from bottom wall 228 is a pair of laterally spaced and longitudinally disposed upstanding vertical side walls 232 and 234 which are generally more or less trapezoidal in shape. Positioned over bottom wall 228 in spaced parallel relation thereto is an interior horizontal wall section 236 which is shorter longitudinally than and cooperates with bottom wall 228 and the lower portions of side walls 232 and 234 to define the major portion of an interior chamber 238, having an open trailing end 240 (see FIG. 7), for receiving, locating and supporting a cassette 20 at an operative position within apparatus 10.

As noted, the horizontal wall 236 forming the top of chamber 238 is shorter than the underlying bottom wall 228 and stops short of the exit slot 142 of the cassette 20 located in its illustrated operative position within chamber 238.

Extending upwardly from the forward edge of wall 236 is a rearwardly inclined wall 242 which extends transversely between the interior surfaces of side walls 232 and 234. Base frame section 202 is capped at its top end by a transverse top wall 243 which extends forwardly of wall 242 and also a short distance rearwardly thereof.

Base frame section 202 is releasably coupled at its lower forward end to base frame section 198 at notched portions 244 formed at the lower forward corners of side walls 232 and 234. As best shown in FIG. 2, notched sections 244 each include a horizontal bearing surface 246 which rests on the upper surface of cross brace 212. Locating and coupling blocks 248 on cross brace 212 are aligned and mated with corresponding blocks 250 on side walls 232 and 234 with the connection therebetween being made by removable coupling pins 252.

With sections 198 and 202 operatively connected, cassette 20 is supported in chamber 238 such that its withdrawal opening 137 is adjacent the pressure-applying rollers 64 and 66 and the forwardmost photosensitive sheet element 14 therein is positioned with its leader tab receiving slot 38 in alignment with the bite line 62 of the rollers.

The first cassette 18 holding a stack of image-receiving sheet elements 12 therein is supported in an upstanding receiving chamber 254 that projects forwardly of wall 242 with the bottom end of chamber 254 having a sheet withdrawal slot 255 therein located over the access slot 142 of the second cassette 20. Chamber 254 is defined by the forward facing surface of wall 242, pivoting door 256 pivotally mounted at its lower end on side walls 232 and 234 at pivot pins 258, and that portion of top wall 243 projecting forwardly of wall 242.

Door 256 is configured for movement between an open position, shown in FIG. 1, for loading or removing a cassette 18 and a closed or operative position wherein the image-receiving sheets 12 in cassette 18 are located in operative relation to a later-to-be-described sheet advancing mechanism.

Door 256 is defined by a generally planar forward wall 260, a pair of rearwardly extending side walls 262, and a bottom wall section 264 which includes an integrally formed table guide ramp 265 that is inclined downwardly and disposed at an angle of approximately 45° with respect to forward wall 260. To maintain door 256 in itts closed position, a latch mechanism 266 on the upper end of wall 260 and a latch receiver 267 on top wall 243 are provided.

The previously noted margin support members 190 are mounted on wall 260 adjacent side walls 262 and are preferably faced with hardened metal ways 268 in facing relation to the picks 58.

Also mounted on the interior surface of door wall 260 is the anti-bowing member 194 and a sheet element biasing plunger assembly 270 for urging the stack of trailing end hold back tabs 46 on sheet elements 12 toward the upper end of wall 242.

The means for guiding a sheet element 12 from a storage position in chamber 254 and along a path of travel that extends from the lower open end 178 of cassette 18 in chamber 254 through withdrawal slot 255 and into the access slot 142 of cassette 20 includes the previously noted guide ramp 60 mounted on the forward side of wall 242 just below the lower end of door 256 and a cooperating curved spring guide member 272 having its upper end fixedly secured to door bottom section 264 by transverse plate 273 and its lower free end extending downwardly along the forward guide surface of ramp 60 to define a guide channel 275 therebetween and urge the tab 52 of the forwardmost sheet element 12 against the forward guide surface ramp 60.

To load a cassette 18 into chamber 254, door 256 is moved to its open position where it conveniently rests on the upper horizontal surface of cross member 212. Cassette 18 is placed on the interior side of door 256 with its rear wall 170 facing door wall 260 and its open bottom end 178 facing apparatus wall 242. When so positioned, the support members 190 extend through marginal openings 188 and the harden ways 268 thereon engage and support the margins of the bottomost sheet elements 12 in the stack. The anti-bowing member 194 extends through center opening 192 in wall 179 and urges the center of the stack toward cassette wall 168 to maintain the base sheet portion 42 of sheet elements 12 in a substantially planar configuration. Also, the biasing plunger assembly 270 extends through opening 184 and engages the hold back tab 46 of the rearwardmost sheet element 12 in the stack. The inclined ramp surface 265 on door 256 serves to bend the bottom section 172 of cassette 18 upwardly along the with stack of tabs 52 thereon. With door 256 in its open condition, the lower portion of spring guide member 272 is backed away somewhat from the guide surface of ramp 60 thereby widening the channel 275 at its upper end to facilitate the insertion of the stack of coupling tabs 52 therebetween. The upward deflection of tabs 52 by ramp 265 predisposes the tab in a preferred tapered wedge configuration for easy insertion into the guide channel 275 in response to moving the door 256 to its closed position.

Door 256 is then pivoted upwardly and moved to its closed position where it is latched. The metal ways 268 on support members 190 are now located in facing relation to the picks 58 and ways 268 serve as a fixed bearing surface against which the margins of the sheet elements 12 are urged by the later-to-be-described picks 58. Anti-bowing member 194 provides its sheet flattening function and the plunger assembly 270 presses the stack of hold back tabs 46 firmly against the forward wall of cassette 168 which is now backed and supported by the rigid top end of wall 242. Biasing assembly 270 serves to stabilize or firmly hold the top end of the stack of sheet elements 12 to insure that only one sheet at a time is detached therefrom.

As best shown in FIG. 2, the spring guide member 272 moves to its operative position when door 256 is closed and the leading ends of the coupling tabs 52 are located between guide ramp 60 and the lower portion of guide member 272.

The means for advancing the forwardmost sheet element 12 along the path of travel into the leading end of cassette 20 will now be described with reference to FIGS. 1, 2 and 7. For the purposes of this disclosure, the term forwardmost when used in relation to sheet elements 12 and cassette 18 refer to that sheet element 12 that is closest to the interior surface of cassette forward wall 168. In FIG. 2 forwardmost sheet element 12 is that sheet element 12 that is closest to the forward surface of apparatus wall 242.

Wall 242 is provided with a pair of generally vertically disposed lateral margin elongated slots 274 located in facing relation to the margin supported ways 268 of support members 190. Also, wall 242 has a centrally disposed elongated vertical slot 276 therein which serves as a guide slot for the sheet advancing mechanism.

Figure 7:
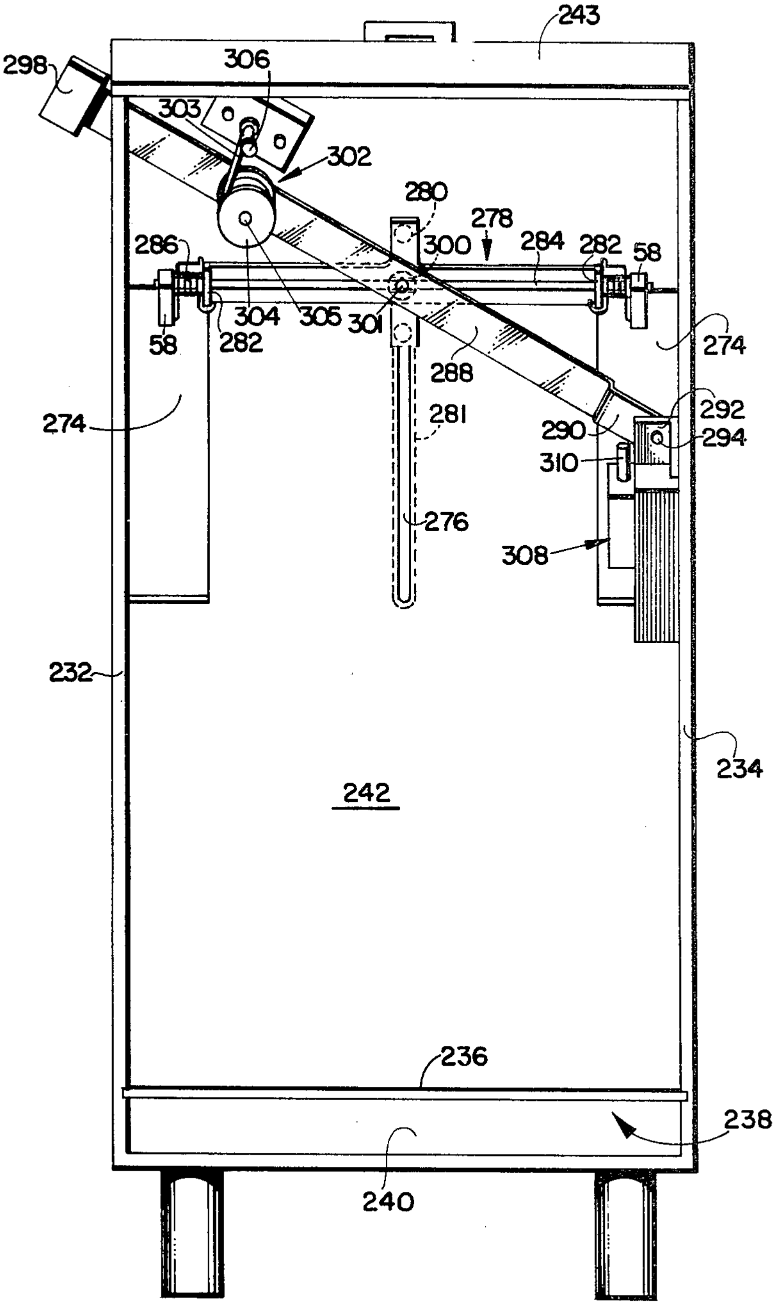
FIG. 7 is a rear elevational view of the apparatus of FIG. 1 showing the details of a sheet advancing apparatus and the open end of a cassette receiving chamber.

As best shown in FIG. 7, the sheet advancing mechanism includes a slider member 278 which may take the form of a cross-shaped sheet metal part slidably mounted on the rear side of wall 242 by means of button pin couplers 280 which ride in a shallow guide channel 281 over slot 276 on the forward side of wall 242. Button pins 280 extend through the slot 276 and are secured to the vertical central portion of slide member 278.

Slide member 278 includes a pair of horizontal arms that extend outwardly to the near edges of slots 274 and terminate in a rearwardly extending side flange 282. Extending through holes in flanges 282 is a horizontal pick support shaft 284 having the pick members 58 fixedly secured to the opposite ends of shaft 284 which extend outwardly beyond the flanges 282 to position the picks 58 in facing relation in the ways 268. The picks 58 are spring biased to rotate in a clockwise direction (as viewed in FIG. 2) by a pair of torsion springs 286, each having one end fixedly secured to a flange 282 and its opposite end to its corresponding pick member 58. In this manner, the lower ends of pick members 58 are normally spring biased into engaging contact with the surface of ways 268.

Pick members 58 are block-like hard metal members that are generally parallelepiped in shape and include lower forwrdly extending sheet engaging edges 287 (see FIG. 1).

The means for moving the slide member 278 up and down along slot 276 include an elongated actuating lever 288 having an offset portion 290 at its right-hand end that is pivotally coupled at its extremity to an L-shaped mounting flange 292 secured to side wall 234 at pivot pin 294. The opposite end of actuating lever 288 extends through an elongated guide slot 296 in the opposite apparatus side wall 232 and terminates in a gripping handle 298.

Actuating lever 288 is operatively coupled to slide member by a U-shaped slide connector 300 having a forwardly facing horizontal channel for receiving shaft 284 and being rotatably or pivotally connected to a mid portion of actuating lever 288 by means of a rearwardly extending pivot pin or rivet 301.

In a preferred embodiment, actuating lever 288 is spring biased upwardly toward its illustrated first terminal position by means of a coiled return spring assembly 302 including elongated coil spring 303, a spring hub 304 rotatably mounted on the backside of lever 288 at shaft 305 and a fixed pin 306 secured to the upper end of wall 242 and to which the free end of the spring 303 is secured.

In response to pivoting lever 288 downwardly from the position shown in FIG. 7, in a counterclockwise manner about pin 294, connector 300 pushes downwardly on shaft 284 thereby pushing slide member 278 downwardly along guide slot 276. In this manner, the picks 58 are driven downwardly to slide the forwardmost sheet element 12 out through the bottom end of cassette 18 and slot 255 along the guide members 60 and 272 defining channel 275 and into cassette 20 through access slot 142. As the actuating lever 288 drives slide member 278 downwardly toward its lower or second terminal position, the coupling connector 300 slides laterally (to the left as viewed in FIG. 7) along shaft 284 and the coiled spring 303 of assembly 302 uncoils from hub 304.

In a preferred embodiment, apparatus 10 includes control and actuating means responsive to the position of actuating lever 288 between its first and second terminal positions for actuating the drive means to drive the rollers 64 and 66. In the illustrated embodiment, the control and actuating means includes a normally opened microswitch 309, mounted on a bracket on apparatus side wall 234, having its actuating plunger 310 aligned under the lower edge of lever arm offset section 290.

As best shown in FIG. 2, switch 308 is electrically connected to a circuit for energizing roller drive motor 218 by means of lead wires 312 and 314.

The plunger 310 of switch 308 is spaced at a predetermined distance from the lower actuating edge of lever arm offset 290 so that the normally open switch 308 is closed when actuating lever 288 is located at a predetermined location between its first and second terminal positions corresponding to a point just before the tab 52 is advanced into the bite 62 of the rollers.

In operation, the photographic system comprising the sheet handling and processing photographic apparatus 10, the self-developing film unit 16 comprising sheet elements 12 and 14, and their respective first and second cassettes 18 and 20 operates in the following manner.

Cassette 20 is located in the open position of FIG. 6 and the protective bag 68 holding a stack of photosensitive sheet elements 14 therein is inserted into the base section 80. As noted earlier, the bag engaging tab 70 at the leading end of bag 68 is inserted through opening 140 to fit the main portion of bag 68 into the base section of the cassette. Upon closing the cover section 82, the sheet retaining hold back pin 156 pierces the bag closure 72 and the stack of trailing end hold back tabs 25 of the sheet elements 14. With cover section 82 closed, tab 70 projects outwardly beyond the forward end of cassette 20 through its leading end withdrawal opening 137. Also, a dark slide 144 is in its fully inserted position blocking the cassette exposure aperture 134.

The loaded cassette 20 is then inserted into its receiving chamber 238 through the traling end opening 240. As shown in FIG. 2, cassette 20 is inserted into chamber 238, withdrawal opening 137 first, and its forward wall 124 with exposure aperture 134 facing upwardly toward frame wall 236. As best shown in FIG. 1, the trailing end of cassette cover section 82 includes an upstanding locating rib 316 which abuts against the traling end surfaces of base frame wall 232, 234 and 236 around opening 240. These last-mentioned surfaces cooperate to form a reference bearing surface for rib 316 so as to accurately locate cassette 20 in its fully inserted position.

Although not shown in the drawings, the tab 70 of bag 68 extends forwardly beyond withdrawal slot 137 so that its leading edge becomes inserted into the bite 62 of pressure-applying rollers 64 and 66 when cassette 20 is located at its fully inserted position in chamber 238.

The loaded cassette 20 is inserted into chamber 238 before a cassette 18 holding the image receiving sheet elements 12 is loaded into its receiving chamber 254. To remove the protective bag 68, the actuating lever 288 is pivoted downwardly a sufficient distance for offset portion 290 to actuate the plunger 310 of microswitch 308. Upon actuation, the normally opened switch 308 is closed causing the motor 218 to be energized thereby activating the drive means to drive rollers 64 and 66 through the previously described gear train. The top roller 64 rotates in a clockwise direction in the lower roller 66 is simultaneously driven in the opposite direction.

The rotating rollers 64 and 66 frictionally engage tab 70 and advance the bag 68 to the left as viewed in FIG. 2. Protective bag 68 is advanced from the cassette 20 through withdrawal opening 137, between rollers 64 and 66 and is advanced along an exit path of travel on the far side of the rollers onto the receiving tray 200. Because the bag closure 72 and the stack of photosensitive sheet elements 14 are secured to the trailing end of cassette 20 by the hold back pin 156, they are held back and remain in cassette 20 while the main portion of the protective bag 68 is withdrawn through opening 137.

Once protective gag 68 is removed, the contents of container 20 are disposed therein as shown in FIG. 2. It will be noted that the forwardmost photosensitive sheet element 14 has its base sheet 22 pressed into supporting relation with support surface 150 while the leader 24 is supported forwardly thereof with its Z-folded portion 22 in the expanded configuration, providing access to coupling slot 38, with the top section 32 of the Z-fold in bearing relation to support surface 152 which is located above the given plane defined by support surface 150.

As noted earlier, the illustrated photograhic apparatus 10 is configured to bring the discrete first and second sheet elements 12 and 14 into coupled relation, and thereafter bring them into registered facing superposition while applying a compressive pressure to discharge the processing composition from container 54 and distribute it between the superposed sheets. Therefore, the forwardmost photosensitive sheet elements 14 in cassette 20 will be photograhically exposed by removing cassette 20 from chamber 238 and mounting it on the appropriate camera back or other photographic apparatus such as an X-ray machine. When mounted on a conventional camera, the dark slide 144 is pulled out of its blocking relation to exposure aperture 134 and the forwardmost photosensitive sheet element 14 is exposed therethrough. Dark slide 144 is pushed in once again to its blocking position and the cassette 20 is then removed from the camera and inserted into its operative position within its receiving, locating and supporting chamber 238.

Prior to processing the exposed sheet element 14, a cassette 18 holding a stack of image receiving sheet elements 12 therein is loaded into receiving chamber 254 in the manner previously described.

When cassette 18 is operatively positioned in chamber 254 the stack of coupling tabs 52 are captured in between the guide ramp 60 and its cooperating facing spring guide member 272. While not shown on the drawings, one skilled in the art will appreciate that while all of the tabs are captured in between guides 60 and 72, they all do not extend down into the channel 275 therebetween to the same depth. Because the sheet elements 12 have the containers 54 at the leading end, the stack of sheet elements 12 takes on a wedge-shaped configuration which is thicker at the leading end and the stack of tabs 52 is deflected by ramp surface 265 to assume a fan-like configuration which resembles a thinly tapered wedge. In other words, the tab 52 of the sheet element 12 closest to cassette wall 168 extends the furthest distance down into the guide channel 275 while the next underlying tabs 52 extend thereinto progressively shorter distances.

As noted earlier, the guide members 60 and 272 define the path of travel for the forwardmost image-receiving sheet element 12 which extends down through the channel 275 defined by guide members 60 and 272 and communicates with chamber 254 at its lower end and extends downwrdly between members 60 and 272 and then curves forwardly and downwardly and enters the access slot 142 of cassette 20.

With the door 256 latched in its closed position, the vertical ways 268 of marginal support members 190 provide a fixed bearing surface spaced forwardly of wall 242 against which the lateral margins of the rearwardmost sheet element 12 in the stack abutts. On the forward side of the cassette 18, the spring biased pick members 58 extend through slots 274 in wall 242 and their sheet engaging edges 287 are urged into firm frictonal engagement with the lateral margin portions of the forwardmost sheet element 12 which is accessible through the marginal opeings 188 in forward wall 168 of cassette 18. As noted earlier, the pick members 58 are rather strongly spring biased to rotate in a clockwise direction about shaft 284 by the pair of torsion springs 286. In effect, the spring biased pick members urge the entire stack of sheet elements 12 against the ways 268 of marginal support members 190. As succeeding sheet elements 12 are advanced from cassette 18 the forwardmost sheet element 12 in the stack will be closer to the ways 268 in receding from the pick members 58. To compensate for this progressive variation in stack thickness, the torsion spring 286 change the angular disposition of pick members 158 for each succeeding sheet element 12.

To couple the forwardmost sheet elements 12 and 14 in cassettes 18 and 20 and subsequently effect their processing, the actuating lever 288 is grasped by its handle 298 and is pivoted downwardly about pivot pin 294. Through the coupling 300, lever arm 288 drives the slide member 278 downwardly along the guide slot 276 thereby driving the pick members 58 downwardy relative to the fixed sheet element support ways 268.

The frictional engagement of members 58 with the forwardmost sheet element 12 drives it downwardly from its storage position causing the perforated center portion 180 to its hold back tab 46 to tear thereby releasing the trailing end of the forwardmost sheet element 12 while the underlying sheets remained in a fixed position stapled to the top of forward wall 168 of cassette 18.

As the forwardmost sheet element 12 is moved downwardly by pick members 58, its leader 48 having the lateraly extending shoulders 50 and the forwardly extending coupling tab 52 thereon, along with fluid container 54, advance down the channel 275 between guide members 60 and 272 and into the forward portion of cassette 20 through the elongated access slot 142. The leading edge of coupling tab 52 engages the horizontal bottom portion 28 of the Z fold and is deflected thereby forwardly so that it advances through tab receiving slot 38, the cassette withdrawal opening 137 and into the bite 62 of the rollers 64 and 66. Just before tab 52 reaches bite line 62, offset portion 290 of actuating lever 288 actuates the plunger 310 of switch 208 thereby energizing motor 218 and driving the rollers 64 and 66.

As the rollers advance the tab 52 of sheet element 12 therebetween the shoulders 50 on leader 48 come into bearing relation with the shoulder bearing portion 40 of the leader 24 of forewardmost sheet element 14 thereby bringing the two sheet elements into operatively coupled relation. Those skilled in the art will realize that this interconnection of the two sheet elements also located them in a predetermined longitudinal registration. It will be noted that the tapered coupling tab 52 increases in width as it approaches the shoulders 50 and that the receiving slot 38 is appropriately dimensioned so that the trailing end of tab 52 fits snugly therein to provide lateral registration of the two sheet elements. The lateral registration is also enhanced by the side wall guide surfaces 166 of cassette 20 which define the lateral boundaries of the elongated axis slot 142.

The coupled sheet elements 12 and 14 are now advanced through withdrawal opening 137 and are brought into facing superposition as they advance between the rollers 64 and 66. When container 54 passes through rollers 64 and 66 they apply sufficient compressive pressure thereto to rupture its trailing end seal causing the processing fluid to be discharged rearwardly therefrom between the two sheet elements for distribution therebetween as the sheet elements 12 and 14 progressively advance between the rollers. The superposed sheet elements 12 and 14 exit from the forward side of rollers 64 and 66 and are advanced onto the retaining tray 200. Following an imbibition period which may vary from 10 seconds to 1 minute depending on the type of self-developing film unit 16 that is being used, the photosensitive and image-receiving sheet elements 14 are separated to reveal a positive image on element 12.

A major advantage of the present invention is that the photosensitive sheet elements 12 are completely enclosed by the cassette 20 and there are no protruding tabs which may be become damaged or mishandled that characterize the prior art systems. Once the forwardmost sheet element 14 in cassette 20 has been removed therefrom, the next underlying sheet element 14 takes its place and its Z-folded portion 26 on leader 24 automatically assumes its expanded configuration.

While the illustrated photographic apparatus 10 has been shown to be configured for film handling and processing only, it will be evident to those skilled in the art that apparatus 10 may be appropriately modified so that the photosensitive sheet elements 12 are exposed while cassette 20 is located in its chamber 238 rather than transferring cassette 20 to a remote camera or X-ray apparatus. In such a modification, the short horizontal wall 236 of rear base frame section 202 would have an exposure aperture therein that would be coextensive with exposure aperture 134 in the forward wall 124 of cassette 20. Imaging optics would be mounted on the base frame rear section 202 behind wall 242 so as to direct image-bearing light downwardly through the aligned exposure apertures to expose the forwardmost photosensitive element 14 in cassette 20. In addition to imaging optics, it is obvious that certain light-sealing structure would have to be provided so that the optical path to the forwardmost photosensitive element 12 is appropriately light sealed. Apparatus 10 could be configured to include conventional camera optics so as to operate as a complete self-developing camera or it may include other optical elements so it can be figured as a slide copying apparatus. Therefore, for the purposes of this disclosure and the claims that follow, the term photographic apparatus will apply to the illustrated film handling and processing apparatus 10 as well as to a modified version including imaging optics and which functions as a self-developing camera and/or a self-developing slide copy apparatus.

In the illustrated embodiment, it was shown that the tab 52 of element 12 extends through slot 38 and out of cassette 20 through withdrawal opening 137 to an engaging position wherein it is engaged with rollers 64 and 66 at bite line 62. It will be understood that the first and second sheet elements 12 and 14 may be modified so that a portion of the second element 14 is advanced out of slot 137 and into engagement with rollers 64 and 66 in response to advancing sheet element 12 into the forward end of cassette 20 through access opening 142.

Because certain changes may be made in the disclosed photographic apparatus 10, and the associated sheet elements 12 and 14 and their associated cassettes 18 and 20 without departing from the scope of the invention herein involved it is intended that all matter contained in the above description or shown in the accompanying drawings shall be interpreted as illustrative and not in a limiting sense.

1. Photographic apparatus for coupling together discrete first and second sheet elements of a film unit in preparation for bringing these sheet elements into superposed relation and distributing a fluid processing composition therebetween, the first and second sheet elements having thereon, respectively, first and second means for operatively coupling the first and second sheet elements to one another, the second sheet element being initially held in a cassette having an access opening communicating with the second coupling means thereon and a withdrawal opening through which the coupled first and second sheet elements may be withdrawn from the cassette, said apparatus comprising:

a frame;

means on said frame for supporting a cassette holding at least one such second sheet element therein;

means on said frame for holding at least one such first sheet element at a storage position outside of the cassette supported by said cassette support means;

means for guiding the one first sheet element from the storage position along a path of travel which enters the cassette through the access opening; and means for advancing the one first sheet element from the storage position, along said path of travel, to a position wherein at least that portion of the one first sheet element having the first coupling means extends into the cassette, through the access opening, and the first coupling means is brought into operative relationship with the second coupling means on the one second sheet element in the cassette to couple the first and second sheet elements to one another so that they may be withdrawn together in superposed relation through the withdrawal opening.

2. The photographic apparatus of claim 1 wherein said advancing means is configured to advance the one first sheet element a sufficient distance along said path such that a portion of the one first sheet element is moved into said cassette through the access opening and out of the cassette through the withdrawal opening such that the portion extends outwardly of the cassette, when the first and second coupling means are in operative relation, so as to provide a section of the coupled first and second sheet elements by which it may be engaged by external engaging means to facilitate withdrawing the coupled sheet elements from the cassette.

3. The photographic apparatus of claim 2 wherein the first sheet coupling means includes a first leader having a shoulder portion and a tab extending forwardly of and being narrower than the shoulder portion, the second coupling means includes a leader having a slot therein and a shoulder bearing portion adjacent the slot, the slot being dimensioned so that the tab, but not the shoulder portion of the first leader, may be advanced therethrough so that the shoulder portion abuts against the shoulder bearing portion of the second leader to effect coupling of the first and second sheet elements, and said advancing means is configured to advance the first sheet element so that the first leader advances into the cassette through the access opening, the tab advances through the slot in the second leader and at least a portion of the tab advances through the withdrawal slot and extends outside of the cassette where it may be engaged to withdraw the first and second sheet elements, which become coupled when the shoulder portion of the first leader abuts against the shoulder bearing portion of the second leader, from the cassette through the withdrawal slot.

4. The photographic apparatus of claim 1 wherein said advancing means is configured to advance one first sheet element a sufficient distance along said path such that a portion of one of the first and second sheet elements is advanced through said withdrawal opening of the cassette in response to such movement of the one first sheet element so as to provide a section of the coupled first and second sheet elements that extends out of the cassette through the withdrawal slot to a position where the section may be engaged by external engaging means for withdrawing the coupled sheet elements from the cassette.

5. Photographic apparatus for coupling together discrete first and second sheet elements of a film unit in preparation for bringing these sheet elements into superposed relation and distributing a fluid processing composition therebetween, the first sheet element including a first leader having a shoulder portion and a tab being narrower than and extending forwardly of the shoulder portion, the second sheet including a second leader having a slot therein and a shoulder bearing portion adjacent the slot, the slot being dimensioned to allow the tab of the first leader, but not its shoulder portion, to pass therethrough, so that the shoulder portion bears against the shoulder bearing portion of the second leader to effect coupling of the first and second sheet elements, the second sheet being initialy held in a cassette having an access opening, in communication with the slot had shoulder bearing portion of the second leader, and a withdrawal slot through which the coupled first and second sheet elements may be withdrawn from the cassette, said apparatus comprising:

a frame;

means on said frame for supporting such a cassette holding at least one such second sheet element therein;

means on said frame for holding at least one such first sheet element at a storage position outside of the cassette supported by said cassette support means;

means for guiding the one first sheet element from the storage position along a path of travel which enters the supported cassette through its access opening; and means for advancing the one first sheet element from the storage position, along said path of travel, to a position wherein at least the first leader enters the cassette through the access opening and the tab of the first leader extends through the slot in the second leader to effect coupling and at least a portion of the tab that extends through the slot also extends through the withdrawal opening to a position outside of the cassette where it may be engaged for further advancement away from the withdrawal opening to thereby withdraw the coupled first and second sheet elements from the cassette.

6. The photographic apparatus of claim 5 wherein said apparatus is further configured for bringing the first and second sheets into superposition and distributing a fluid processing composition therebetween and said apparatus further includes processing means for operatively engaging the coupled first and second sheet elements, initially by engaging the portion of the tab extending out of the withdrawal opening, advancing the coupled first and second sheet elements from the cassette through the withdrawal opening and relative to said processing means to bring the first and second sheets into superposition, and distributing a fluid processing composition therebetween, said advancing means being configured to advance the one first sheet element a sufficient distance along said path of travel such that the tab portion extending out from the withdrawal slot is advanced into operative engagement with said processing means.

7. Photographic apparatus for coupling together discrete first and second sheet elements of a film unit, bringing the coupled first and second sheet elements into superposition, and distributing a fluid processing composition therebetween by applying pressure to the superposed sheet elements, the first sheet element including a first leader having first sheet coupling means thereon and the second sheet element including a second leader having second sheet coupling means thereon and being configured to cooperate with the first sheet coupling means for coupling the first and second sheet elements to one another, the second sheet element being initially held in a cassette having an access opening, communicating with the second coupling means of the second sheet element therein, and a withdrawal opening being spaced from the access opening and through which the coupled first and second sheet elements may be withdrawn from the cassette, said apparatus comprising:

a frame for mounting and supporting components of said apparatus;

means on said frame for supporting such a cassette holding at least one such second sheet element therein;

means on said frame for holding at least one such first sheet elements at a storage position outside of the cassette supported by said cassette supporting means;

means for guiding the one first sheet element from the storage position along a path of travel that enters the cassette through its access opening;

means for advancing the one first sheet element from the storage position and along said path of travel a sufficient distance such that the first leader advances into the cassette through the access opening, the first sheet coupling means thereon operatively associates with the second sheet coupling means of the second sheet element in the cassette, and a portion of the first leader also advances through the withdrawal opening and extends outside of the cassette to a leader engagement position; and processing means for engaging the portion of the first leader extending out from the withdrawal opening to said leader engagment position and advancing the first sheet element away from the withdrawal opening to simultaneously withdraw the coupled first and second sheet elements therthrough and advance them relative to said processing means to bring the coupled first and second sheet elements into superposition while applying pressure progressively along the length of the superposed sheet elements to effect processing composition distribution therebetween.

8. Photographic apparatus for coupling together discrete first and second sheet elements of a shelf-developing film unit, for bringing the first and second sheet elements into superposed relation, and distributing a fluid processing composition, provided in a rupturable container on one of the first and second sheet elements, between the two sheet elements, the first sheet element including a first leader having a shoulder and a tab that is narrower than and extends forwardly of the shoulder, the first sheet element being initially provided in a first cassette holding a plurality of first sheet elements in stacked relation and including a withdrawal opening through which the forwardmost first sheet element in the stack may be advanced out of the first cassette, the second sheet element including a second leader having a tab receiving slot and a shoulder bearing portion adjacent the tab receiving slot which is dimensioned to admit the passage of the first sheet element tab therethrough but not its shoulder which is configured to bear against the shoulder bearing portion when the tab fully extends through the tab receiving slot to operatively couple the first and second sheet elements together, the second sheet element being initially provided in a second cassette holding a plurality of such second sheet elements therein and including an access opening communicating with the second leader on the forwardmost second sheet element therein and a withdrawal opening through which a forwardmost second sheet element and a first sheet element, advanced into the second cassette through the access opening and into coupled relation with the forwardmost second sheet element, may be withdrawn from the second cassette to bring these two sheet element into superposition, said apparatus comprising:

- a support frame for mounting and supporting various components of said apparatus thereon;
- means on said support frame for receiving and supporting such a first cassette holding a plurality of first sheet elements;
- means on said support frame for receiving and supporting such a second cassette holding a plurality of second sheet elements;
- guide means on said support frame for defining a path of travel, for the forwardmost first sheet element in the first cassette, extending from the withdrawal opening of the first cassette to the access opening of the second cassette and for guiding the forwardmost first sheet element along said path of travel as it is advanced from the first cassette;
- advancing means for advancing the forwardmost sheet element through the withdrawal opening of the first cassette with its first leader foremost, and along said path of travel such that the first leader enters the second cassette through the access opening and its tab advances through the tab receiving slot of the forwardmost second sheet element in the second cassette to bring the forwardmost first and second sheet elements into coupled relation and at least a forward portion of the tab advances through the withdrawal opening of the second cassette and is located at a tab engagement position outside of the second cassette; and
- processing means for engaging the tab portion located at said tab engagement position, for advancing the coupled first and second sheet elements relative to said processing means for withdrawing them through the withdrawal opening of the second cassette together to bring them into superposition and for applying pressure progressively along the length of the superposed first and second sheet elements to rupture the container, discharge the fluid processing composition between the superposed first and second sheet elements.

9. The photographic apparatus of claim 8 wherein the first sheet elements of the type that tends to bow and depart from a planar configuration prior to processing, the first cassette includes an access opening providing access to the stack of first sheet elements therein and said apparatus further includes first biasing means for extending through the access opening and urging the stack of bowed first sheet elements into a substantially planar configuration to maintain the first sheet elements in proper operative relation with said advancing means.

10. The photographic apparatus of claim 9 wherein said means for receiving and supporting the first cassette includes means for defining a first cassette receiving chamber including an access door mounted on said support frame for movement between an open position providing access for loading and unloading a first cassette and a closed position wherein said access door cooperates with complementary portions of said support frame to define said receiving chamber for the first cassette and said first biasing means for urging the stack of bowed first sheet elements into a substantially planar configuration includes a member mounted on said access door which extends through the access opening of first cassette in said receiving chamber to engage the stack when said access door is located in its said closed position.

11. The photographic apparatus of claim 10 wherein the first cassette includes margin slots providing access to the lateral margins of the stack of first sheet elements and said access door further includes margin support members thereon which extend through the cassette margin slots and engage the lateral margins of the first sheet element closest thereto for providing support for the lateral margins of the first sheet elements in the stack.

12. The photographic apparatus of claim 8 wherein the trailing ends of the first sheet elements, opposite their leader ends, are releasably coupled together in a central coupling area, the first cassette includes a coupling area opening providing access to the coupling area and said apparatus further includes second biasing means, on said access door, which extends through the coupling area opening, when the access door is in its closed position, and urges the coupling areas of the first sheet elements against a wall of the cassette to hold the underlying first sheet elements in position when the forwardmost first sheet element is being detached from the stack in response to its advancement along said path of travel by said advancing means.

13. The photographic apparatus of claim 9 wherein said guide means includes a first guide member, fixedly mounted on said support frame between the means for supporting the first cassette and said means for supporting said second cassette, and a second guide member mounted on said access door for movement therwith between an operative position, when said access door is closed, wherein said second guide member is adjacent said first guide member and cooperates therewith to define a guide channel therebetween into which the tabs of th first sheet elements in the first cassette extend and along which the forwardmost first sheet element is adapted to be advanced by such advancing means and an inoperative position, when said access door is in said open position, wherein at least a portion of said second guide member is spaced from said first guide member a distance that is greater than the relative distance therebetween when said second guide member is in its said operative position to facilitate locating the stack of tabs between said first and second guide members when the first cassette is introduced into said first cassette receiving and supporting chamber.

14. The photographic apparatus of claim 13 wherein said second guide member includes a spring for urging the tab of the forwardmost first sheet element into bearing engagement with said first guide means.

15. The photographic apparatus of claim 13 wherein said guide means further includes a ramp surface on said access door for deflecting the stack of tabs toward said guide channel, defined by said first and second guide members, to guide the first sheet members to said guide channel.

16. The photographic apparatus of claim 8 wherein said advancing means includes a slide member mounted on said support frame for sliding movement in a plane that is substantially parallel to a plane containing the forwardmost first sheet element in the stack of first sheet elements in the first cassette located in said first cassette receiving and supporting means, at least one pick member pivotally mounted on said slide member, pick biasing means for pivotally urging said pick member into operative engagement with the forwardmost first sheet element in the stack, and a slide member actuating lever pivotally coupled with one end thereof to said support frame and being slidably connected to said slide member and being adapted to be pivoted from a first position to a second position to move said slide member from an initial position to a terminal position during which said one pick on said slide member engages and advances the forwardmost first sheet element along said path of travel to effect sheet coupling and the location of the tab at the tab engagement position, said actuating lever being configured to be pivoted back to said first position to relocate said slide member in its said initial position.

17. The photographic apparatus of claim 16 wherein said support frame includes an elongated slot therein through which an opposite end of said actuating lever extends to a position exteriorly of said support frame where the operator may manually grasp said opposite end and move said lever from said first position to said second position.

18. The photographic apparatus of claim 16 wherein said processing means includes a pair of pressure applying rollers having the bite thereof positioned to operatively receive the tab located at said tab engagement position, and drive means rotatably driving at least one of said rollers to effect the advancement of the coupled first and second sheet elements therebetween to apply pressure progressively along the length of the first and second sheet element, and said apparatus further includes control means for initiating operation of said drive means after said advancing means begins to advance the forwardmost first sheet element along said path of travel but before the tab thereon reaches said tab engagement position, said control means being responsive to the location of said actuating lever between its said first and second positions to control operation of said drive means.

19. A cassette, for use with separate first and second sheet elements forming a film unit, for holding and supporting at least one such second sheet element and being configured to have a first sheet element advanced, from a position outside of said cassette, into at least a portion of said cassette to bring the first sheet element into coupled relation with the one second sheet element in preparation for withdrawing the coupled sheet elements from said cassette together to bring them into superposition, the first sheet element including a first base sheet, a first leader at a leading end thereof, and first sheet coupling means on the first leader, the second sheet element including a second base sheet, a second leader at a leading end thereof and second sheet coupling means for receiving the first coupling means of a first sheet element advanced into operative relation therewith and cooperating with the first sheet coupling means for coupling the first and second sheet elements together, said cassette comprising:

a cassette housing;

means in said cassette housing for supporting the second base sheet of at least one such second sheet element;

means in said cassette housing for supporting the second leader of the one second sheet element;

means for defining an access opening in said cassette housing in communicating relation with the second leader, supported by said leader support means, and the second coupling means thereon and through which at least the first leader of a first sheet element may be advanced to bring its first sheet coupling means thereon into coupled relation with the second sheet coupling means of the second sheet element in said cassette; and means for defining a withdrawal opening in said cassette housing through which the coupled first and second sheet elements may be advanced together to bring them into superposed relation.

20. The cassette of claim 19 wherein said withdrawal opening is spaced from said access opening and said cassette is configured such that the first sheet element coupled to the second sheet element in said cassette advances through at least an interior portion of said cassette between said access and withdrawal openings in response to advancing the coupled first and second sheet elements through said withdrawal opening.

21. The cassette of claim 20 wherein said cassette housing includes a forward wall and a leading end section disposed in substantially perpendicular relation to said forward wall, said access opening is located in said forward wall and said withdrawal opening is located in said leading end section.

22. The cassette of claim 20 wherein the second base sheet of the second sheet element includes at least one photosensitive layer thereon, said forward wall includes a radiation transmission section therein through which actinic radiation may be transmitted to expose the one photosensitive layer on the second base sheet supported by said second base sheet support means and said access opening in said forward wall is located between said radiation transmission section and said leading end section having said withdrawal opening therein.

23. The cassette of claim 19 wherein the first sheet coupling means includes a shoulder and tab on the first leader, the tab being narrower than and extending forwardly of the shoulder and the second coupling means includes a tab receiving slot and a shoulder bearing portion of the second leader which includes a Z folded portion being configured for movement between collapsed and expanded positions and having contiguous bottom, middle and top sections and bottom and top fold lines between the bottom and middle sections and middle and top sections, respectively, the slot of the second coupling means being adjacent the bottom fold line and the shoulder being portion being located on opposite sides of the slot, and wherein said means for supporting the second base sheet includes a base sheet support surface against which the second base sheet is urged to support the second base sheet in a given plane and said leader support means includes a leader bearing surface being located in spaced offset relation to said given plane and against which the top section of the Z folded portion bears thereby maintaining the Z folded portion in its expanded position with the bottom section located in said given plane and the middle section being obliquely inclined with respect to said given plane thereby locating the slot and shoulder in communication with the access opening in position to receive the tab and shoulder of the first coupling means.

24. The cassette of claim 23 wherein said cassette is configured to hold a plurality of such second sheet elements in stacked relation therein and said base sheet support surface in configured to have at least a portion of the base sheet of the forwardmost second sheet element in the stack in bearing relation therwith and said base sheet and second leader support means includes biasing means for urging the stack upwardly toward said base sheet and leader bearing surfaces, and said biasing means and leader bearing surface cooperate to maintain the Z folded portion of the second sheet elements behind the forwardmost sheet element inn the collapsed position while at the same time applying forces to the Z folded portion of the forwardmost second sheet element to maintain it in its extended configuration.

25. A photographic system for coupling together discrete first and second sheet elements of a self-developing film unit, bringing the coupled first and second sheet elements into superposition, and distributing a fluid processing composition therebetween by applying a compressive pressure to the superposed sheet elements, said system comprising:

a first sheet element including a first leader having first sheet coupling means thereon;

a second sheet element including a second leader having second sheet coupling means thereon configured to cooperate with said first sheet coupling means for coupling said first and second sheet elements to one another;

a rupturable container holding a supply of fluid processing composition therein and being provided on one of said first and second sheet elements;

a cassette for holding at least one of said second sheet elements and including an access opening communicating with the second sheet coupling means of said second sheet element therein and a withdrawal opening through which the coupled first and second sheet elements may be withdrawn from said cassette;

in combination with photographic apparatus including;

a frame for mounting and supporting various components of said apparatus;

means on said frame for supporting said cassette holding said second sheet element;

means on said frame for supporting said first sheet element at a storage position outside of said cassette supported by said cassette supporting means;

means for guiding said first sheet element from said storage position along a path of travel that enters said cassette through its said access opening;

means for advancing said first sheet element from the storage position and along said path of travel a sufficient distance such that said first leader advances into said cassette through said access opening, said first coupling means thereon operatively associates with said second sheet coupling means of said second sheet element in said cassette, and a portion of said first leader also advances through said withdrawal opening and extends outside of said cassette to a leader engagement position; and processing means for engaging said position of said first leader at said leader engaging position and advancing said first sheet element away from said withdrawal opening to simultaneously withdraw said coupled first and second sheet elements therethrough annd advance them relative to said processing means to bring said first and second sheet elements into superposition while applying pressure progressively along the length of said superposed sheet elements to rupture said fluid container and discharge said fluid therefrom and distribute said fluid between said first and second sheet elements.

* * * * *